Nov. 18, 1958     J. V. HUFF ET AL     2,860,720
ADJUSTABLE TOEBOARD FOR AN AUTOMOBILE
Filed Jan. 18, 1956     4 Sheets-Sheet 1

INVENTORS
John V. Huff &
Robert F. McLean
BY
Paul Fitzpatrick
ATTORNEY

Nov. 18, 1958   J. V. HUFF ET AL   2,860,720
ADJUSTABLE TOEBOARD FOR AN AUTOMOBILE
Filed Jan. 18, 1956   4 Sheets-Sheet 3

INVENTORS
John V. Huff &
BY Robert F. McLean
Paul Fitzpatrick
ATTORNEY

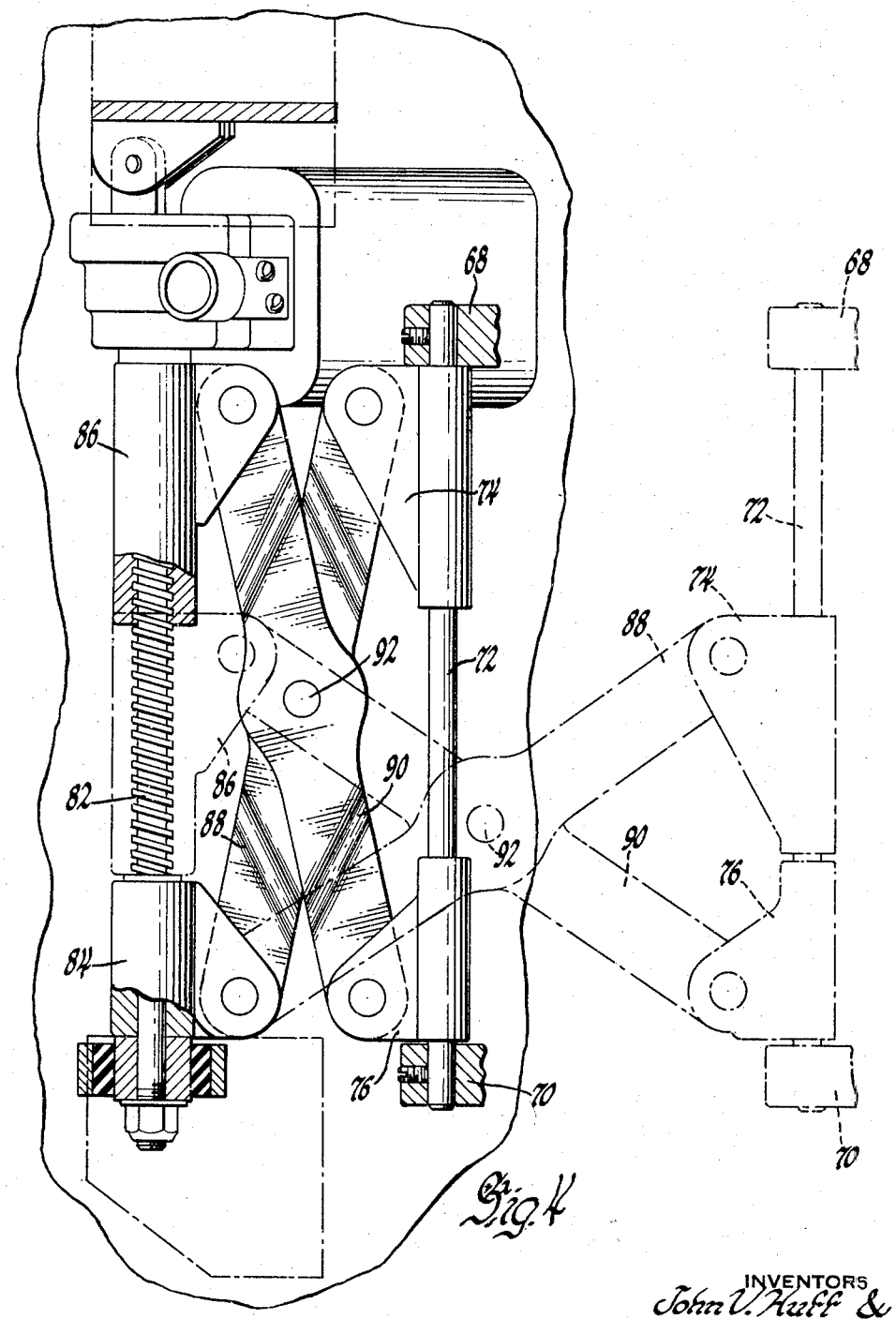

United States Patent Office 2,860,720
Patented Nov. 18, 1958

2,860,720

ADJUSTABLE TOEBOARD FOR AN AUTOMOBILE

John V. Huff, Harper Woods, and Robert F. McLean, Oak Park, Mich., assignors to General Motors Corporation, Detroit, Mich., a corporation of Delaware Application January 18, 1956, Serial No. 559,871

6 Claims. (Cl. 180—90.6)

This invention relates to a toeboard, and more particularly to an adjustable toeboard for a vehicle.

One feature of the invention is that it provides an improved toeboard; another feature of the invention is that it provides a movable toeboard for changing the distance between the fuel and brake pedals and the seat; a further feature of the invention is that the toeboard is swingably mounted and means are provided for adjusting the angular position of the toeboard to swing it toward or away from the seat; still another feature of the invention is that the toeboard movably mounts brake and fuel pedals, the distance of these pedals from the seat varying with the angular position of the toeboard; and yet a further feature of the invention is that power operated actuating means in the engine compartment of the vehicle are connected to the toeboard adjacent the lower side thereof for controlling the angular position of the toeboard.

Other features and advantages of the invention will be apparent from the following description and from the drawings, in which:

Fig. 4 is an enlarged fragmentary section taken along the line 4—4 of Fig. 2 showing the power operated actuating means, parts being shown in one position in solid lines and in another position in broken lines.

Figure 1:
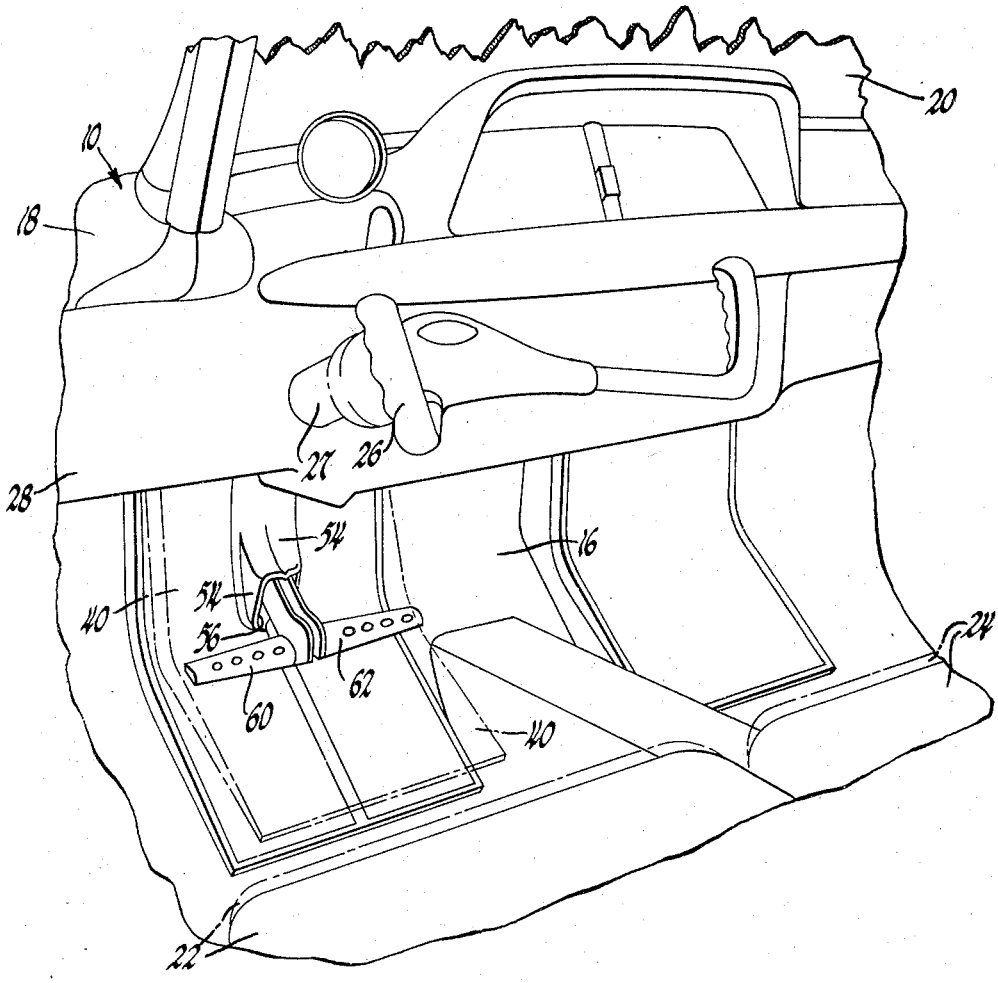
Fig. 1 is a fragmentary perspective view of the inside of the passenger compartment of a vehicle having the improved toeboard therein, the toeboard being shown in its most forward position in full lines and in its rearmost position in broken lines.

In most automobiles the seats, and particularly the driver's seat, are adjustable longitudinally of the car to change the distance between the seat cushion and the foot control pedals. The adjustable seat requires more space than it would if it were not longitudinally movable and the longitudinal adjusting apparatus also utilizes space in the passenger compartment. Often the drive shaft tunnel interferes with the location of the transverse rods which are part of the seat adjuster, making it necessary to raise the seat to an undesirable height. This may be of particular importance in a low-roofed automobile, as in a sport car. This invention provides an improvement over a longitudinally adjustable seat by providing a movable toeboard upon which the foot control pedals are mounted. By moving the toeboard toward or away from the seat, the distance between the seat and the pedals may be varied without moving the seat longitudinally. This conserves space in the passenger compartment since the seat may be fixedly mounted or mounted for vertical movement only without the necessity of using a bulky horizontal seat adjuster. Furthermore, the space through which the toeboard is movable normally is not used for any other purpose so that useable space in the passenger compartment is conserved. In the preferred embodiment which is illustrated in the drawings, the toeboard in front of the driver's seat is swingably mounted, being pivoted adjacent its upper end and being connected adjacent its lower end to power operated actuating means in the engine compartment for adjusting its angular position. If desired, the toeboard in front of the passenger's seat can also be made adjustable.

Figure 2:
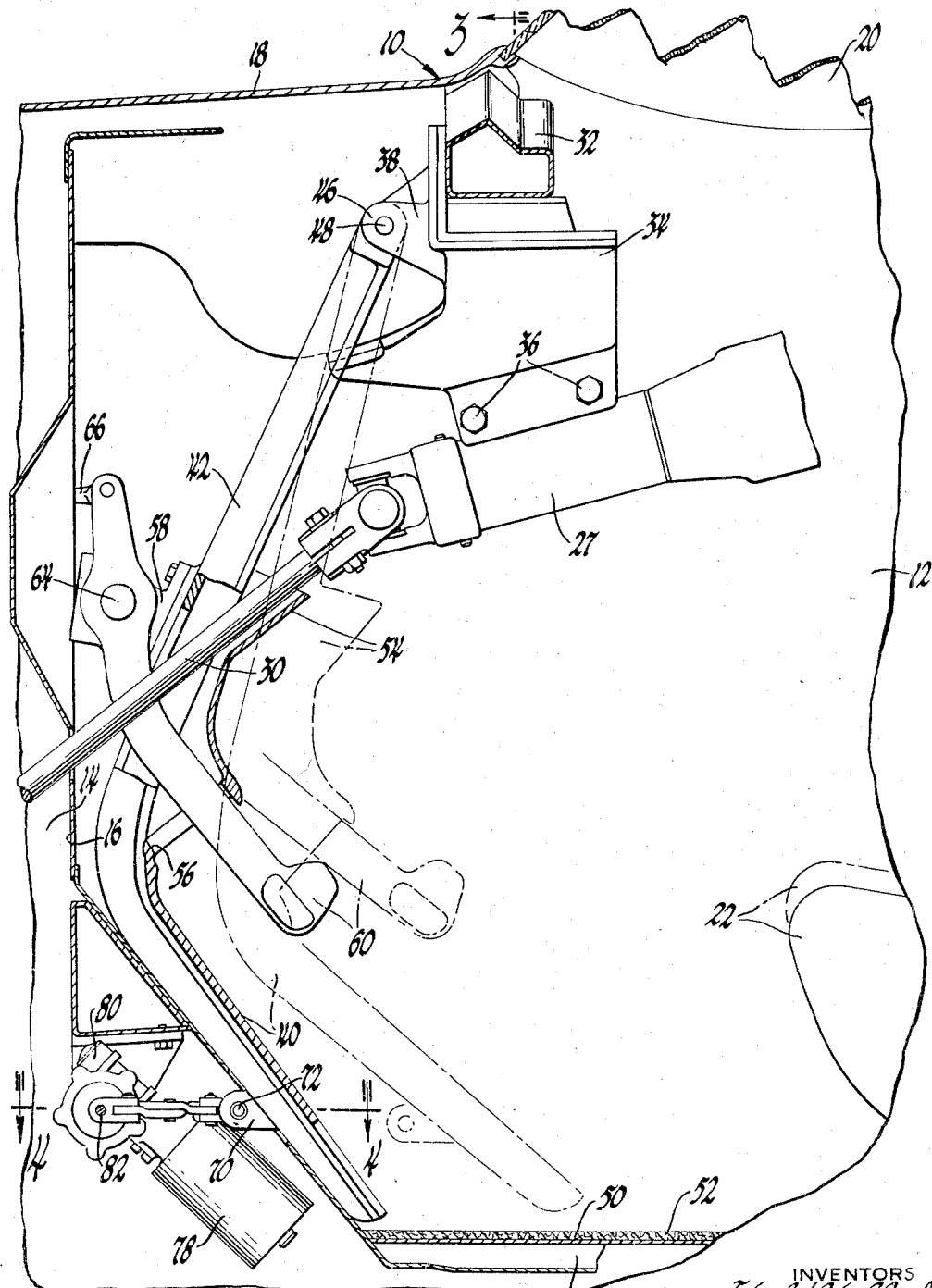
Fig. 2 is a fragmentary longitudinal vertical section through a portion of the engine and passenger compartments of the automobile, the movable toeboard being shown in its most forward position in full lines and in its rearmost position in broken lines.
Figure 3:
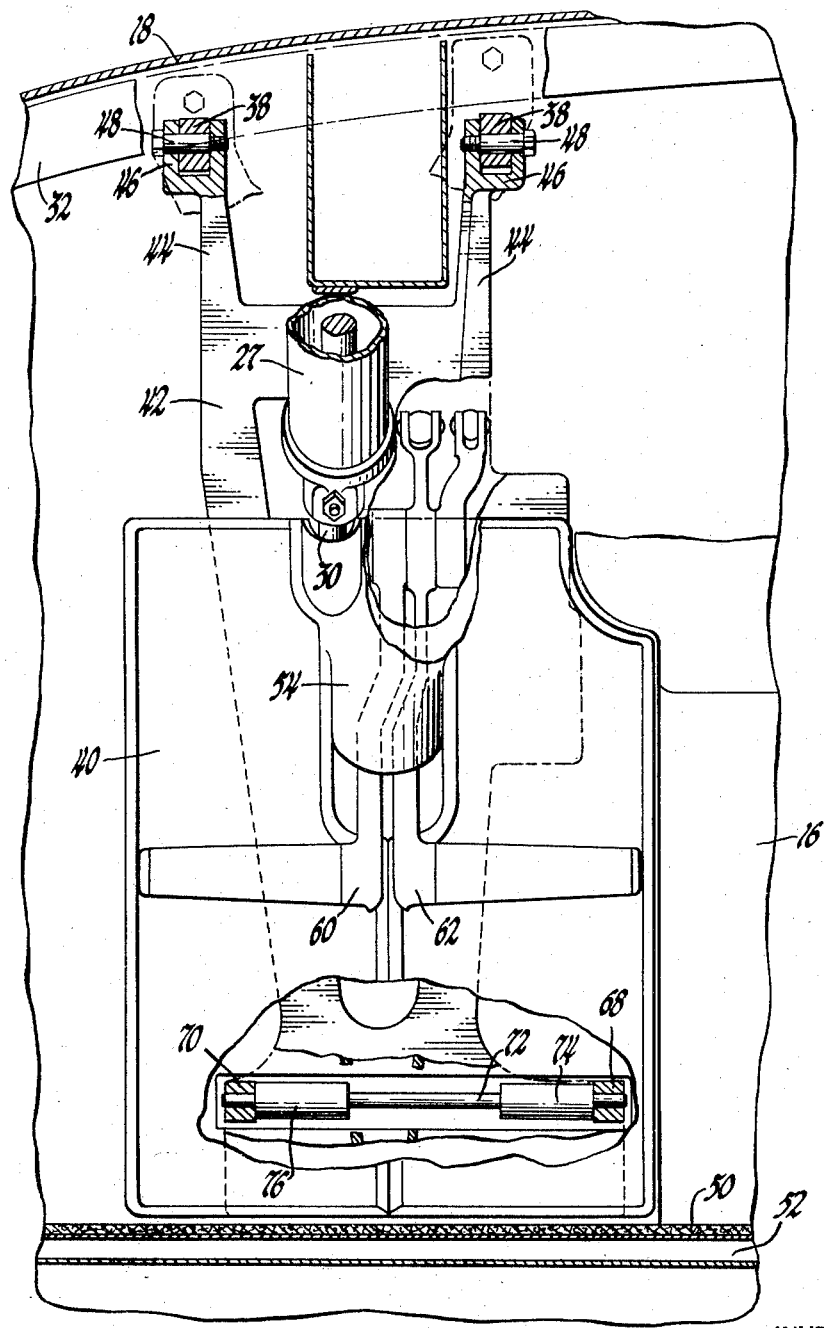
Fig. 3 is a vertical transverse section taken along the line 3—3 of Fig. 2, parts being broken away to show underlying structure.

Referring now more particularly to the drawings, an automobile designated generally as 10 in Figs. 1 and 2 has a passenger compartment 12 and an engine compartment 14 separated by a fire wall 16. The engine compartment is at the front of the automobile below the hood 18 and the passenger compartment is provided with a forwardly facing windshield 20 in conventional manner. Within the passenger compartment 12 there is a driver's seat 22 and a passenger's seat 24, which seats preferably are vertically adjustable as shown in broken lines in Figs. 1 and 2. These seats are illustrated only fragmentarily since they may be of conventional construction, including a cushion and a generally vertical back. Forwardly of the driver's seat there is a steering control 26 mounted on a column 27 which extends through the automobile dashboard 28. The steering column is swively connected to a rod 30 which extends into the engine compartment 14 through an opening in the fire wall 16.

Below the lower edge of the windshield 20 there is a transverse structural body support member 32 to which is secured a casting 34. The steering column 27 is bolted at 36 to flanges on the lower side of the casting 34, and at the forward side spaced hinge supports 38 project from the casting. The toeboard in front of the driver's seat, which is designated by the reference character 40, is bolted to a toeboard support casting 42 which, at its upper end, has spaced arms 44 terminating in apertured yokes 46. The lugs 38 which project from the support casting 34 are received in the yokes 46 and bolts or pintles 48 swingably mount the toeboard casting 42 on the support casting 34. As seen best in Fig. 2, the toeboard 40 and its support casting 42 are formed as a dog leg or L when viewed in vertical section, having an upper portion which extends downwardly and forwardly from the pintles 48 and having a lower portion which is the toeboard proper and which extends downwardly and rearwardly, terminating adjacent a carpet 50 which covers the vehicle floor 52.

Adjacent its center the toeboard is formed with a truncated housing portion 54 having an opening 56. Behind this housing there is a pedal support bracket 58 secured to the support casting 42 and a brake pedal 60 and a fuel pedal 62 are pivotally mounted on the support bracket 58, the pivotal mounting for the brake pedal 60 being shown at 64 in Fig. 2. The forward end of the brake pedal is connected to an actuating rod 66 and the forward end of the fuel pedal 62 may be similarly connected to a rod, these rods extending through the fire wall 16 into the engine compartment and being connected to the proper control means therein.

As seen best in Fig. 2, the toeboard may be swung between a forward position shown in solid lines and a rearward position shown in broken lines and the distance of the pedals 60 and 62 from the driver's seat 22 depends upon the angular position of the toeboard. In order to control this angular position, there are power operated actuating means in the engine compartment 14 connected to the toeboard adjacent the lower side thereof. The support casting 42 has adjacent its lower end forwardly projecting lugs 68 and 70 which extend through the fire wall and between which a slide bar 72 is mounted. Connecting brackets 74 and 76 are mounted on the rod 72, at least the bracket 74 being freely slidable thereon.

A reversible electric motor 78 is connected through a gear box 80 to a screw device 82, which, at one end, mounts a rotatable bearing 84 which does not travel longitudinally along the screw, and at the other end mounts a traveling nut 86 threaded on the screw. A pair of scissors links 88 and 90 are connected between the screw jack device and the rod 72 on the bracket 42. One end of link 88 is pivotally connected to the bearing 84 and the other end is pivotally connected to the bracket 74 on the rod 72, said bracket being slidable on the rod 72. One end of link 90 is pivotally connected to the traveling nut 86 and the other end is pivotally connected to the bracket 76 on the rod 72. The scissors links are pivotally connected together adjacent their centers at 92. When the motor 78 is operated, the traveling nut 86 is driven along the screw jack 82 to any desired position between the extreme positions shown in Fig. 4. Movement of the nut 86 along the screw jack operates through the scissors links to swing the bracket 42 and the toeboard 40 between the extreme positions shown in Figs. 4 and 2 so that the distance of the brake pedal 60 and the fuel pedal 62 from the driver's seat 22 may be adjusted. Any conventional switch means, preferably operated from the passenger compartment, may be used to operate the motor 78 in either direction. The motor, of course, may be connected to the automobile electric power source in conventional manner.

Since the toeboard swings from a pivotal connection at its upper end, the adjustment may be made without using any space which normally is used in the passenger compartment. Because the toeboard is adjustable, drivers of different size may be accommodated without making the seat movable longitudinally and no useable space in the passenger compartment need be occupied by a bulky seat adjuster. Also, since the seat does not move longitudinally, there is no necessity for reserving several inches of otherwise useable space to accommodate fore and aft seat movement.

While we have shown and described one embodiment of our invention, it is capable of many modifications. Changes, therefore, in the construction and arrangement may be made without departing from the spirit and scope of the invention as set forth in the appended claims.

We claim:

1. In combination in a vehicle having a passenger compartment and an engine compartment forwardly of the passenger compartment and separated therefrom by a generally vertical fire wall, a fixed support member in the passenger compartment, a toeboard panel extending in generally parallel relationship to said fire wall, means hingedly mounting said toeboard adjacent its upper end on said support member for swinging movement toward and away from said fire wall, operating means in the engine compartment for swinging said toeboard toward and away from said fire wall, means connecting said operating means to the toeboard at a location spaced from the hinge mounting thereof, and at least one control pedal movably mounted on said toeboard.

2. In combination in a vehicle having a passenger compartment and an engine compartment forwardly of the passenger compartment and separated therefrom by a generally vertical fire wall, a fixed support member in the passenger compartment, a toeboard panel extending in generally parallel relationship to said fire wall, means hingedly mounting said toeboard adjacent its upper end on said support member for swinging movement toward and away from said fire wall, power actuated operating means in the engine compartment for swinging said toeboard toward and away from said fire wall, means connecting said operating means to the toeboard near the lower end thereof, and at least one control pedal movably mounted on said toeboard.

3. In combination in a vehicle having a passenger compartment and an engine compartment forwardly of the passenger compartment separated therefrom by a generally vertical fire wall, a fixed support member in the passenger compartment, a toeboard panel extending in generally parallel relationship to said fire wall, means hingedly mounting said toeboard adjacent its upper end on said support member for swinging movement toward and away from said fire wall, a seat mounted in said passenger compartment rearwardly of the toeboard, operating means in the engine compartment for swinging said toeboard toward and away from said fire wall independently of said seat, means connecting said operating means to the toeboard at a location spaced from the hinge mounting thereof, and at least one control pedal movably mounted on said toeboard.

4. In combination in a vehicle having a passenger compartment and an engine compartment forwardly of the passenger compartment and separated therefrom by a generally vertical fire wall, a fixed support member in the passenger compartment, a toeboard panel extending in generally parallel relationship to said fire wall, means hingedly mounting said toeboard adjacent its upper end on said support member for swinging movement toward and away from said fire wall, a seat mounted in the passenger compartment rearwardly of said toeboard, power actuated operating means in the engine compartment for swinging said toeboard toward and away from said fire wall independently of said seat, means extending through the fire wall and connecting said operating means to the toeboard near the lower end thereof, and a brake pedal and a fuel pedal movably mounted on said toeboard.

5. In combination in a vehicle: a seat; a unitary toeboard assembly located forwardly of said seat and including a toeboard portion and a support portion; at least one control pedal movably mounted on said toeboard assembly; means for hingedly mounting said toeboard assembly adjacent its upper end for swinging movement toward and away from said seat to change the distance between said pedal and seat, said support portion having mounting extensions adjacent its upper end; and power-operated actuating means connected to said toeboard assembly and being independent of said seat for controlling the angular position of the toeboard assembly and the distance between said pedal and seat.

6. In a vehicle having a passenger compartment and an engine compartment with a fire wall therebetween, apparatus of the character described, including: a seat mounted in the passenger compartment; a unitary toeboard assembly in the passenger compartment adjacent the fire wall, said assembly including a toeboard portion and a support portion; at least one control pedal movably mounted on said toeboard assembly; means for hingedly mounting said toeboard assembly at its upper end for swinging movement to change the distance between said pedal and seat, said support portion having a pair of mounting arms at its upper end; and actuating means in the engine compartment connected through said fire wall to said toeboard assembly adjacent the lower side thereof to control the angular position of said toeboard assembly independently of said seat and thereby change the distance between said pedal and seat.

References Cited in the file of this patent

UNITED STATES PATENTS

| 2,620,042 | Vincent | Dec. 2, 1952 |

FOREIGN PATENTS

| 734,938 | Germany | May 3, 1943 |
| 613,199 | Great Britain | Nov. 23, 1948 |